(12) United States Patent
Cornaby et al.

(10) Patent No.: US 6,393,492 B1
(45) Date of Patent: May 21, 2002

(54) METHOD AND ARRANGEMENT FOR OPERATING A MASS MEMORY STORAGE PERIPHERAL COMPUTER DEVICE CONNECTED TO A HOST COMPUTER

(75) Inventors: Stephen R. Cornaby, Niwot; Tracy D. Harmer, Longmont, both of CO (US)

(73) Assignee: Texas Instruments Incorporated, Dallas, TX (US)

( * ) Notice: Subject to any disclaimer, the term of this patent is extended or adjusted under 35 U.S.C. 154(b) by 1029 days.

(21) Appl. No.: 08/553,024

(22) Filed: Nov. 3, 1995

(51) Int. Cl.[7] .............................................. G06F 13/10
(52) U.S. Cl. .......................................... 709/321; 713/2
(58) Field of Search ................................. 345/680, 685, 345/681; 709/310, 331, 321, 324, 327; 713/2

(56) References Cited

U.S. PATENT DOCUMENTS

| | | |
|---|---|---|
| 5,319,751 A | 6/1994 | Garney |
| 5,371,885 A | 12/1994 | Letwin |
| 5,412,798 A | 5/1995 | Garney |

*Primary Examiner*—Alvin Oberley
*Assistant Examiner*—Sue Lao

(74) *Attorney, Agent, or Firm*—W. Daniel Swayze, Jr.; W. James Brady; Frederick J. Telecky, Jr.

(57) ABSTRACT

An arrangement and method are disclosed herein for operating a mass memory storage peripheral computer device connected to a host computer. The host computer has system RAM associated with the host computer and is operated using an operating system and a system BIOS. The mass memory storage peripheral computer device is connected to the host computer using a peripheral bus in which relocatable expansion BIOS location addresses are allowed. The arrangement and method include a loadable device driver for controlling the operation of the mass memory storage peripheral computer device during the operation of the computer system. During the start-up of the computer system, the loadable device driver is loaded into the system RAM for use during the operation of the system. The loadable device driver allows the host computer to communicate with and control the operation of the mass memory storage peripheral computer device in a way which does not require the system BIOS or any other type of protocol translation mechanism to be provided between the loadable device driver and the operating system or the mass memory storage peripheral computer device in order for the loadable device driver to communicate with the operating system and the mass memory storage peripheral computer device.

57 Claims, 2 Drawing Sheets

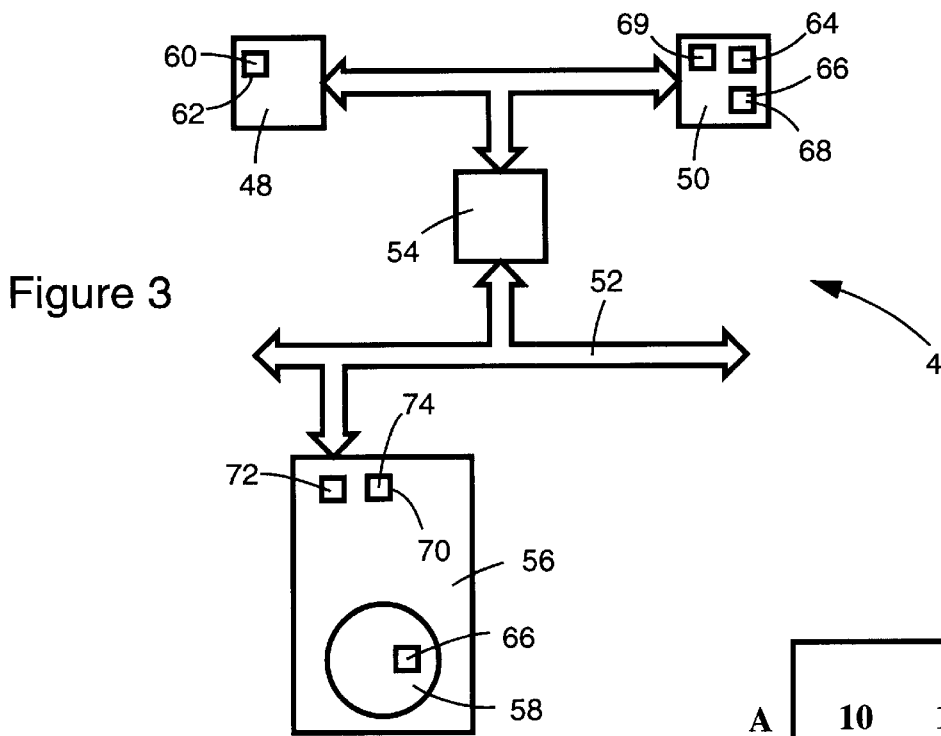
Figure 3
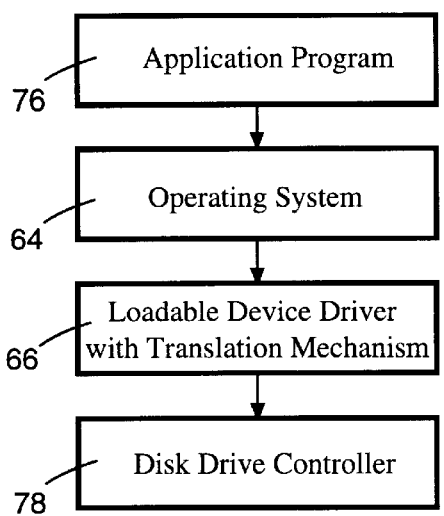
Figure 4
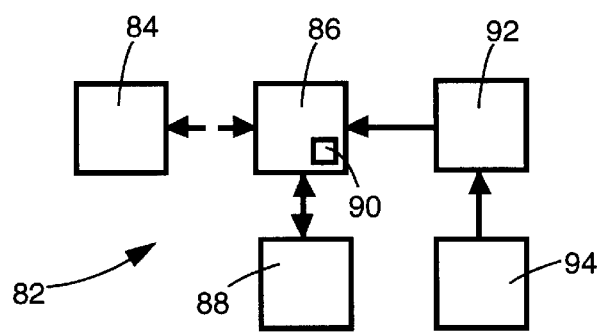
Figure 5
Figure 6

METHOD AND ARRANGEMENT FOR OPERATING A MASS MEMORY STORAGE PERIPHERAL COMPUTER DEVICE CONNECTED TO A HOST COMPUTER

BACKGROUND OF THE INVENTION

The present invention relates generally to an arrangement for and method of operating a mass memory storage peripheral computer device, such as a hard disk drive, connected to a host computer using a peripheral bus in which relocatable Expansion Basic Input Output System (BIOS) location addresses are allowed. The computer has system Random Access Memory (RAM) and uses an operating system and system BIOS to operate the host computer. More particularly the present invention relates to a loadable device driver which is associated with the hard disk drive and which is loaded into the system RAM during the start-up of the computer system. The loadable device driver controls the operation of the hard disk drive in a way which does not require the system BIOS or any other protocol translation mechanism other than the loadable device driver to be provided between the hard disk drive and the operating system in order for the operating system to communicate with the hard disk drive.

During the development of the personal computer industry, the typical arrangements for operating a hard disk drive connected to a host computer have gone through a series of evolutions. When the personal computer was first being developed, it was assumed that hard disk drives would be divided into cylinders, heads, and sectors which would clearly define each data sector in which information could be stored on the hard disk drive. The DOS operating system defined a multiple byte, bit significant command structure with organizational limits of 1024 cylinders, 64 heads, and 64 sectors which corresponded to a total of 4,194,304 data sectors. The system BIOS, or a utility program used by this early computer system was used to store any defective data sectors of the hard drive which were required to be known by the system when the drive was formatted for use by the system. The system would not allow these defective data sectors to be used during the operation of the system. Therefore, only known good data sectors-were used to store data and the actual cylinder, head, and sector (CHS) on which the data was stored on the hard disk drive corresponded to the CHS data addressing information used by the operating system.

In the early stages of development, the system BIOS also contained information on all of the disk drives which could be used with the system. As the number of drives available grew this approach became more and more difficult. The solution was to create user defined configuration information which could be used by the system.

These early approaches allowed the operating system to communicate with the disk drive using a relatively simple system BIOS which did not need to perform any translation of the CHS data address information. When the operating system of these early systems made a read/write request through the device driver, the system BIOS would simply pass the CHS address information on to the disk drive without having to translate the address information into some other format. Also, the disk drive was relatively simple in that it did not require any complex disk drive firmware as part of the disk drive to provide a translation function or handle the problem of keeping track of the defective data sectors since these functions were provided by the system.

The disk drive industry independently developed its own interface standards or limits known as Integrated Device Electronics (IDE) which also included a command structure. These IDE standards imposed limits which were different from the limits imposed by the operating system and system BIOS. The IDE command structure limits were set at 65535 cylinders, 16 heads, and 256 sectors which provided a total of 268,431,360 data sectors. Since both standards utilized the same CHS addressing structure, the overall system limits were dictated by the lowest common bits for each field for the cylinders, heads, and sectors. This resulted in a combined limit of 1024 cylinders, 16 heads, and 64 sectors for a total of 1,048,576 data sectors. Although the combination of these two different limits did not initially create a problem by overly limiting the total data storage capacity of the disk drive, the demand for larger and larger capacity disk drives did eventually create desire to offer drives which provided more sectors than were available according to the combination of these two limits.

To compensate for these combined limits, translation software was developed to translate from the operating system limits to the IDE drive limits. This software was provided in the form of either translating BIOS or boot overlay software. The translation software allowed the operating system to use the entire theoretical number of data sectors which the operating system limits allowed by translating from an operating system based CHS address to a disk drive based CHS address. However, each time a read/write request was made by the operating system, the translator had to translate the operating system's theoretical CHS address information (based on the DOS operating system standards) into logical CHS address information used by the disk drive (based on the disk drive industry standards). This translation required additional processing time slowing down the system but it increased the number of available data sectors back to the limits imposed by the operating system.

Technical developments in the disk drive industry further complicated the task of interfacing the hard disk drive with the host system. The first additional development was that the hard disk drive industry began defining each data sector according to cylinders, heads, sectors, and zones. The zones of the disk drive correspond to different groups of cylinders of the disks with each of the zones having data stored at different frequencies in order to more efficiently use the data storing density of the disks. For example, the inner cylinders which correspond to a first zone may be read and written at a first frequency, the middle cylinders making up a second zone may be read/written at a second faster frequency, and the outer cylinders associated with a third zone may be read and written at a third even faster frequency. Although this development increase the storage capacity of a given hard disk drive, it also further increased the complexity of the overall system by requiring another translation from the system BIOS CHS address information to the actual cylinder, head, sector, and zone address information actually used by the disk drive.

In another development, the disk drive industry changed the way the cylinders, heads, and sectors were typically addressed. Initially, each data sector on the disk drive included an identification field containing the address of that field and including information on whether that sector was defective or not. These identification fields for each of the data sectors used a significant portion of the data storage space on the disk drive thereby reducing the amount of usable data storage space for a given disk drive. As more advanced disk drives having more sophisticated controllers became available, the need for an identification field associated with each data sector was eliminated thereby increasing the data storage capacity of a given disk drive. However, using this approach required the defect information identifying which sectors of the disk drive are defective to be stored in a different way.

In order to solve this problem, a defect list containing a list of all the defective data sectors on the disk drive is typically stored on the memory storage of the hard disk drive and loaded into a RAM memory buffer on the disk drive device during the initialization of the disk drive so that the list is available to the hard drive controller during the operation of the disk drive. This approach requires an even more complicated controller, more complicated disk drive firmware to operate the controller, and a larger RAM memory buffer than would otherwise be required so that the defect list may be stored in the memory buffer for use throughout the operation of the disk drive. All of these requirements add still further to the cost of providing the hard disk drive. Using this defect list approach, the hard disk drive controller uses complex hardware and/or disk drive firmware to sort through this list of defective memory locations each time a read/write request is made making sure a defective data sector is not utilized. This sorting adds yet another time consuming process to the operation of the system that must be performed each time the disk drive reads or writes data and therefore slows down the overall operation of the system.

In more recent developments in computer architecture, new peripheral bus architectures such as the Peripheral Computer Interconnect (PCI) bus have been defined. These new peripheral bus architectures allowed relocatable device specific software to be loaded from the device into system RAM in the form of relocatable expansion BIOS. This greatly reduces the device's dependency on the system BIOS. In one example of this approach, a mass storage adapter card such as a Small Computer System Interface (SCSI) card is connected to the PCI bus and contains expansion BIOS software in ROM.

Referring to FIG. 1, a typical current computer system, generally indicated by reference numeral 10, including an IDE hard disk drive and a hard disk drive connected to the system using a SCSI adapter card and a PCI bus will be described. As shown in FIG. 1, system 10 includes a host computer module 12 (hereinafter referred to in the specification and the claims as a host computer) having system BIOS ROM 13 and system RAM 14. The system is operated using a system BIOS 15 and a translating BIOS 11 which are stored within system BIOS ROM 13. A host bridge 16 connects host computer 12 to an ISA bus 17 and a PCI bus 18. A first hard disk drive 19 is connected to ISA bus 17 using ribbon cable 20. Drive 19 includes disk drive firmware 21 stored in ROM 22 and disk drive controller 23 for controlling the operation of disk drive 19. A peripheral device, in the form of a SCSI adapter card 24 is connected to PCI bus 18 and includes a protocol translator 25 for translating all of the communications passing through adapter card 24 between the PCI protocol of the PCI bus and the protocol of the adapter card, in this case SCSI protocol. Adapter card 24 also includes expansion BIOS ROM 26 which contains expansion BIOS for initializing adapter card 24 during the start-up of the system. System 10 further includes a second hard disk drive 27 which is connected to adapter card 24. Disk drive 27 includes a RAM memory buffer 28, a disk drive controller 29, and disk drive firmware 30 stored within ROM 31 for controlling the operation of the hard disk drive. 27. Hard disk drive 27 is electrically connected to adapter card 24 using ribbon cable 32. Both hard disk drive 19 and 27 are divided into cylinder, heads, sectors, and zones which specifically define each data sector within hard disk drive 19 and 27.

In a typical PCI based system as described above, when the system is turned on, system BIOS 15 checks the system first for peripheral devices connected to ISA bus 17 such as disk drive 19. In this case, when disk drive 19 is located, the system BIOS initializes disk drive 19 and configures it for use within the system. Hard disk drive 19 includes a RAM memory buffer 34 and the initialization process for hard disk drive 19 includes loading information such as a defect list of all of the defective memory locations on the hard disk drive from the memory storage of hard disk drive 19 into RAM memory buffer 34. This information is available for use by disk drive firmware 21 throughout the operation of disk drive 19.

After the ISA devices have been configured, the system then checks for peripheral devices connected to PCI bus 18 such as adapter card 24. When adapter card 24 is located, the system BIOS checks to see if there is any expansion BIOS associated with the adapter card. If there is expansion BIOS associated with the adapter card, in this case the expansion BIOS in expansion BIOS ROM 26, the expansion BIOS is loaded into RAM 14 and adapter card 24, along with any attached peripherals such as disk drive 27, are initialized. The initialization process for hard drive 27 includes loading information such as a defect list of all of the defective memory locations on the hard disk drive from the memory storage of hard disk drive 27 into RAM memory buffer 28 so that this information is available for use by disk drive firmware 30 throughout the operation of disk drive 27. After system 10 is finished checking for devices connected to the PCI bus of the system, the system BIOS goes on to load an operating system which is used to control the operation of the overall system.

Referring to FIG. 1 along with the block diagrams of FIGS. 2A and 2B respectively, the operation of system 10 when an application program 35 being run on the system makes a read/write request of either hard disk drive 19 or 27 will be briefly described. With respect to hard drive 19 and as shown in FIG. 2A, when application 35 makes a read/write request of hard drive 19, an operating system 36 for operating the system 10 receives the request and determines the theoretical, or logical, address information at which operating system 36 believes the data is stored within disk drive 19. Translating BIOS 11, which is provided in system BIOS ROM 15 of host computer 12, translates the logical operating system address information into system BIOS address information. System BIOS 15 then translates this address information into address information used by IDE disk drive 19. Firmware 21, using controller 23, translates the address information from the system BIOS into physical cylinder, head, sector, and zone address information used by the disk drive and checks a defective memory location list to make sure defective data locations are not utilized. Once these three translations are complete, controller 23 reads or writes the requested information.

Referring now to FIG. 2B, when application 35 makes a read/write request of drive 27, operating system 36 receives the request and determines the theoretical, or logical, address information at which operating system 36 believes the data is stored within disk drive 27. The expansion BIOS translates the logical address information used by operating system 36 to address information used by disk drives as indicated in box 38. PCI bridge 16 passes the request to protocol translator 25 on adapter card 24. Protocol translator 25 translates the request from PCI protocol to SCSI protocol and forwards the request to disk drive 27. Firmware 30, using controller 29, translates the address information into physical cylinder, head, sector, and zone address information used by the disk drive and checks the defective memory location list stored in memory buffer 28 to make sure defective data locations are not utilized. And finally, after each of these translations are complete, controller 29 reads or writes the requested information.

As can be seen by the above description, several translations are required in both directions for each information request for both disk drive 19 and disk drive 27. These, translations use processing time slowing the speed of the overall system. Also, this general approach requires a complex translating BIOS or expansion BIOS and complex disk drive firmware on the disk drive in order to operate the currently available complex disk drives typically used in current systems. These requirements add significantly to the cost of the hard disk drive by requiring (i) a substantial amount of ROM for storing the disk drive firmware, (ii) a relatively large amount of RAM memory buffer space for storing the defect list, and (iii) a more powerful processor or controller to perform the tasks of translating the address information and sorting through the defect list.

The present invention provides an arrangement for operating a mass memory storage device, such as a hard disk drive, which is connected to a host computer. As will become apparent with the description hereinafter of FIG. 4, this arrangement provides a loadable device driver including a translation mechanism which replaces all of the above described translations with a single translation performed between the operating system and the mass memory storage device. In accordance with the invention, by eliminating the multiple translations required by the prior art system, the arrangement allows simpler disk drive firmware to be provided on board the hard disk drive and significantly reduces the need for memory storage space such as ROM for storing the disk drive firmware. The invention also allows information such as defect list information to be loaded into system RAM during the start-up of the system thereby eliminating the need for RAM memory buffer space on the disk drive for storing this information for use during the operation of the disk drive. The combination of these novel approaches significantly reduces the cost of the hard disk drive.

SUMMARY OF THE INVENTION

As will be described in more detail hereinafter, an arrangement and method are disclosed herein for operating a mass memory storage peripheral computer device connected to a host computer. The host computer has system RAM associated with the host computer and is operated using an operating system and a system BIOS. The mass memory storage peripheral computer device is connected to the host computer using a peripheral bus in which relocatable expansion BIOS location addresses are allowed. The arrangement and method include a loadable device driver for controlling the operation of the mass memory storage peripheral computer device during the operation of the computer system. During the start-up of the computer system, the loadable device driver is loaded into the system RAM for use during the operation of the system. The loadable device driver allows the host computer to communicate with and control the operation of the mass memory storage peripheral computer device in a way which does not require the system BIOS or any other type of protocol translation mechanism to be provided between the loadable device driver and the operating system or between the loadable device driver and the mass memory storage device in order for the loadable device driver to communicate with the operating system and the mass memory storage device.

In one specific embodiment, the mass memory storage peripheral computer device takes the form of a hard disk drive and the loadable device driver is stored on the hard disk drive. During the start-up of the system the loadable device driver is loaded from the hard disk into the system RAM. The loadable device driver includes a translating mechanism which translates data address information between (i) logical address information used by the operating system which is associated with a theoretical location of the data within a theoretical mass memory storage device and (ii) physical address information used by the actual hard disk drive. The physical address information is associated with the actual physical location at which the data is stored within the hard disk drive. The hard disk drive includes a particular number of cylinders, heads, sectors, and zones which precisely define a particular data storage area within the hard disk drive. The physical address information provided by the loadable device driver includes information giving the correct cylinder, head, sector, and zone within which the data is stored.

In the hard disk drive embodiment being described, the loadable device driver includes permanently stored defect information identifying defective memory locations of the hard disk drive. The loadable device driver uses the permanently stored defect information to translate the data address information between the operating system and the hard disk drive such that the defective memory locations on the hard disk drive are not utilized during the operation of the system. The system also includes an arrangement for detecting additional defective memory locations on the hard disk drive during any given period of operation of the hard disk drive. The loadable device driver includes a mechanism for storing additional defect information identifying those additional defective memory locations. The additional defect information is stored during the given period of operation of the hard disk drive (i) within system RAM for use by the loadable device driver and (ii) within the hard disk drive such that the additional defective memory locations become part of the permanently stored defect information and therefore is used during subsequent initializations of the hard disk drive. The loadable device driver uses the defect information to always access the hard disk drive at an initial non-defective address location forming part of the data address information being translated between the operating system and the hard disk drive. The loadable device driver also includes means, for example a pointer, for using the defect information to identify at least the first successive defective memory location which comes after the initial non-defective address location on the hard disk drive and which is associated with the data address information being translated between the operating system and the hard disk drive.

In another aspect of the invention, an updated or revised version of the loadable device driver is provided on a computer memory storage medium such as a floppy disk or a compact disk. This updated version is used to update or revise the original loadable device driver which is stored within the hard disk drive.

BRIEF DESCRIPTION OF THE DRAWINGS

The features of the present invention may best be understood by reference to the following description of the presently preferred embodiments together with the accompanying drawings in which:

FIG. 3 is a block diagram of computer system using a PCI bus to connect a hard disk drive to a host computer, the hard disk drive including a loadable device driver in accordance with the present invention;

FIG. 4 is a block diagram illustrating the operation of the system of FIG. 3 when an application program being run on the system makes a read/write request of hard disk drive;

FIG. 5 is a table illustrating one embodiment of a pointer used in the operation of the loadable device driver of FIG. 3; and FIG. 6 is a block diagram illustrating the operation of a computer system in accordance with the present invention.

DETAILED DESCRIPTION

Figure 1:
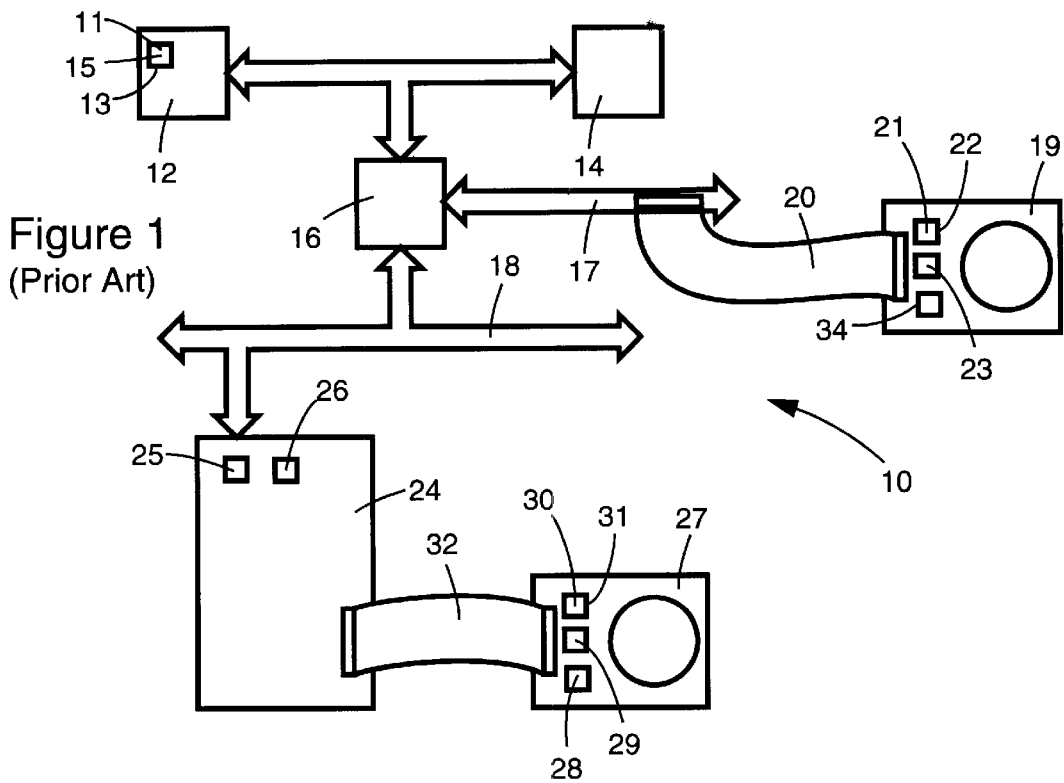
FIG. 1 is a block diagram of a prior art computer system using a ISA bus to connect a first hard disk drive to the system and a PCI bus to connect a second hard disk drive to the system.

Referring to FIG. 3, a computer system designed in accordance with the present invention and generally designated by reference numeral 46 will be described. Computer system 46 includes a host computer 48, RAM 50, a peripheral bus 52 such as a PCI bus, a host bridge 54 connecting bus 52 to host computer 48 and system RAM 50, and a mass memory storage peripheral computer device 56 having mass memory storage 58. Mass memory storage device 56 is connected to host computer 48 using peripheral bus 52. Host computer 48, system RAM 50, and host bridge 54 are made up of any suitable and readily providable components which allow host computer 48 and RAM 50 to be connected to peripheral bus 52 using host bridge 54. These components include, but are not limited to, any conventional 486, Pentium®, Power PC®, or RISC based components. Although host computer 48, system RAM 50, and host bridge 52 are shown having a particular configuration relative to one another, it should be understood that this is not a requirement of the present invention. Instead, these components may be interconnected in a variety of specific configurations and still remain within the scope of the invention so long as the mass memory storage peripheral computer device 56 is connected to these components using peripheral bus 52 as described hereinafter.

Peripheral bus 52 may be any suitable and readily providable peripheral bus in which relocatable expansion BIOS location addresses are allowed. One preferred embodiment of such a peripheral bus is a PCI bus. However, it should be understood that a wide variety of peripheral buses, such as other parallel buses, serial buses, or multiplexed buses would also fall within the scope of the present invention. If a PCI bus is utilized, the PCI specification dictates how any expansion BIOS associated with a particular peripheral computer device is loaded into RAM 50 of the host system. Other local bus configurations have corresponding specifications, and therefore, the present invention will be described in detail assuming that a PCI bus is being used to connect peripheral computer device 56 to host computer 48. The application of the invention to other peripheral bus configurations will become clear to those skilled in the art in view of this disclosure. Although the peripheral bus will be described throughout this specification as being a PCI bus, this is not a requirement. Any peripheral bus in which relocatable expansion BIOS location addresses are allowed would equally apply.

Host computer 48 is operated using a system BIOS 60 which is stored in a system ROM 62. After the start-up of system 46, an operating system 64 which is loaded into system RAM 50 during the start-up of the system controls the operation of the system. As will be described in more detail hereinafter, in accordance with the present invention, system 46 includes an arrangement for loading a loadable device driver 66 into system RAM 50 during the start-up of the system. Loadable device driver 66 has a translating mechanism 68 for translating data address information communicated between operating system 64 and mass memory storage device 56. Defect lists 69 may also be loaded into system RAM 50 by loadable device driver 66 during the start-up of the system. Loadable device driver 66 may also include access to information within defect lists 69 which identifies all of the defective memory locations within mass memory storage device 56.

Loadable device driver 66 is loaded into system RAM 50 such that it is able to communicate with both operating system 64 and mass memory storage device 56 without requiring the use of system BIOS 60 or any other protocol translation mechanism between loadable device driver 66 and either operating system 64 or mass memory storage device 56. Although loadable device driver 66 does not require the presence of any other translation mechanisms between the loadable device driver and either the operating system or the mass memory storage device, it should be understood that even if other translation mechanisms are present within the system, the invention would equally apply so long as the loadable device drive is able to translate directly the data address information between the operating system and the mass memory storage device.

Loadable device driver 66 may be stored in the conventional manner within a ROM 70 on device 56 with at least a portion of ROM 70 being expansion BIOS ROM. Using this approach, loadable device driver 66 would be loaded into system RAM 50 in the conventional manner as describe in the background of the invention. Alternatively, loadable device driver 66, along with the majority or all of the expansion BIOS associated with device 56, may be stored in memory storage 58 of device 56 and loaded into system RAM 50 as described in detail in copending U.S. patent application Ser. No. 08/542,690, now U.S. Pat. No. 5,835,760, entitled METHOD AND ARRANGEMENT FOR PROVIDING BIOS TO A HOST COMPUTER, filed Oct. 13, 1995, which application is incorporated herein by reference. Using the approach described in the referenced application, loadable device driver 66 is loaded from memory storage 58 into system RAM 50 during the start-up of the system. This approach allows the size of ROM 70 to be minimized thereby reducing the cost of device 56.

Another significant advantage of storing the loadable device driver in the memory storage of the mass memory storage device as described in the referenced application is that the loadable device driver may be easily updated. Using the conventional approach of storing the loadable device driver in a separate ROM IC, updating of the loadable device driver within ROM would require the device to be disassembled in order to replace the expansion BIOS ROM. However, using the approach of storing the loadable device driver in the mass memory storage allows the loadable device driver to be updated by simply transferring an updated version of the loadable device driver into the mass memory storage of the mass memory storage device. For example, if a bug is found in the loadable device driver or if a revised version of the loadable device driver becomes available, the corrected or updated version may be made available on a memory storage medium such as a floppy disk or compact disk which may be used to transfer the new version of the loadable device driver into the mass memory storage of the mass memory storage device. In some situations, the loadable device driver may be stored in a protected portion of the mass memory storage of the device which is not user accessible. In this situation, a utility program may be provided with the updated version of the loadable device driver which contains the appropriate mechanism to access and update the protected portion of the memory storage which contains the loadable device driver.

Still referring to FIG. 3, in one preferred embodiment of the present invention, mass memory storage peripheral computer device 56 is a hard disk drive and memory storage 58 is the hard disk drive memory storage. The hard disk drive memory storage 58 of hard disk drive 56 is divided into conventional heads, cylinders, sectors, and zones which define the specific location within memory storage 58 of each data storage location. Hard disk drive 56 includes a disk drive controller 72 and disk drive firmware 74 to control its operation. As will be described in more detail hereinafter, disk drive controller 72 and disk drive firmware 74 are significantly reduced in complexity relative to conventional disk drive controllers and disk drive firmware for comparable hard disk drives due to the configuration of loadable device driver 66. By reducing the complexity of the disk drive controller and disk drive firmware and, as will also be described in more detail hereinafter, by eliminating the need for memory buffer space to store defect memory location information, the cost of hard disk drive 56 may be even further reduced.

Now that the basic configuration of system 46 has been described, the operation of the system shown in FIG. 3 will be briefly described for a given period of time when an application program 76 being run on the system makes a read/write request of the hard disk drive. As illustrated in FIG. 4, when application 76 makes a read/write request, operating system 64 receives the request and determines the theoretical, or logical, data address at which operating system 64 believes the data is stored within disk drive 56 in the same way as described for conventional systems. However, in accordance with the present invention, the translating mechanism 68 of loadable device driver 66 translates the logical data address information used by operating system 64 directly into cylinder, head, sector, and zone data address information actually used by disk drive 56 without using system BIOS 60. Loadable device driver 66 also sorts through defect lists 69 in system RAM 50 to identify any defective memory locations associated with the data address information being translated. These identified defective memory locations are made available to disk drive firmware 74 and disk drive controller 72 to insure that only good data sectors are utilized. Since there is no adapter card used in system 46, there is no protocol translation required and PCI bridge 54 passes the request directly to disk drive 56. As indicated in box 78, since loadable device driver 66 has already sorted defect lists 69 to identify any defective data locations and has already translated the address information into address information which is actually used by the disk drive controller 12, disk drive firmware 74 simply causes disk drive controller 72 to read or write the requested information while using the identified defective memory locations to insure that only good data sectors are utilized.

In accordance with the present invention, loadable device driver 66 includes all of the information necessary to translate data address information requests from operating system 64 into address information which may be directly used by disk drive 56. This information includes (i) defective memory location lists 69 identifying defective data sector locations on disk drive memory storage 58 and (ii) all of the information about the physical configuration of drive 56 necessary for loadable device driver 66 to translate data address information, or logical address information, from operating system 64 into cylinder, head, sector, and zone data address information actually used by disk drive 56. Because the computer system of the invention uses a peripheral bus, such as a PCI bus, in which relocatable expansion BIOS location addresses are allowed, all of this information may be loaded from the mass memory storage 58 of disk drive 56 into host system RAM 50 during the initialization of disk drive 56 as described in detail in the referenced application.

As described above in the background, in a conventional system this defect and physical configuration information is provided and remains within the hard disk drive itself. The hard disk drive controller is required to use this information to translate the CHS address information from the system BIOS to address information including zone information which can be used by the disk drive. Also, the task of sorting through the defect lists and making sure only good data sectors are utilized is performed by the disk drive firmware. The present invention moves this information and these tasks from the disk drive to the host computer by storing all of the necessary information within host system RAM. The host computer RAM is used to store the entire defect lists associated with the disk drive and the information on the physical configuration of the disk drive. This eliminates the need for memory buffer space on the disk drive for storing the defect lists. Also, the processor of the host computer, which is much faster than the typical hard disk drive controller, is used by the loadable device driver to sort the defect lists (which are now in the host system RAM) and identify which data sectors associated with each read/write request are defective. This defect information which is specific to the particular read/write request being processed is made available to the hard disk drive. And finally, the host computer processor is used by the loadable device driver to translate the logical data address information from the operating system into actual physical data address information, including zone information, which is used directly by the disk drive controller and firmware.

By having the loadable device driver (i) use the host computer RAM to store the defect information and (ii) use the host computer processor to perform the translation and sorting tasks, in other words by shifting these tasks from the hard drive to the host computer, the cost of the hard drive may be significantly reduced. Specifically, in a typical conventional hard drive, the memory buffer is large enough to store at least 128 sectors of data which requires at least 64K of RAM. A large portion of this memory buffer is used to store the defect lists for use by the disk drive controller throughout the operation of the disk drive. By storing the defect lists in system RAM rather than the memory buffer of the disk drive a much smaller memory buffer may be used reducing the cost of providing the necessary memory buffer. Also since a significant amount of the tasks performed by the conventional disk drive firmware of a prior art disk drive have been moved to the loadable device driver, the disk drive controller and the disk drive firmware associated with the disk drive controller of the invention may be significantly less complex. This approach allows a less expensive disk drive controller to be used without reducing the performance of the disk drive and, because the complexity of the disk drive firmware is significantly reduced, this approach significantly reduces the ROM storage space required to store the disk drive firmware. The combination of these cost savings results in a substantial overall cost savings for a hard disk drive designed in accordance with the present invention.

Figure 2A:
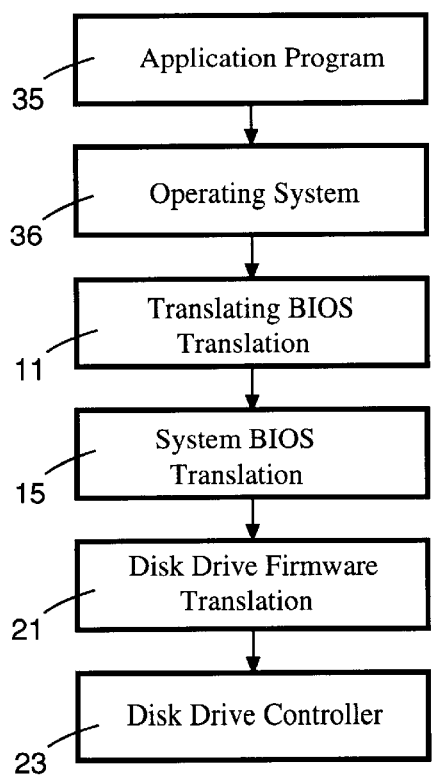
FIG. 2A is a block diagram illustrating the operation of the system of FIG. 1 when an application program being run on the system makes a read/write request of the first hard disk drive.
Figure 2B:
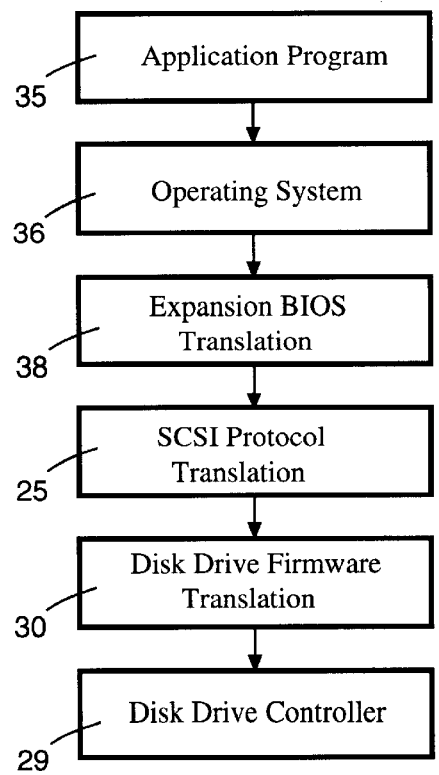
FIG. 2B is a block diagram illustrating the operation of the system of FIG. 1 when an application program being run on the system makes a read/write request of the second hard disk drive.

Another advantage of this approach is that only one translation needs to be performed between the operating system and the disk drive. Because the loadable device driver includes the defect information and information on the zones and the specific physical configuration of the disk drive, it is able to translate the logical data address information from the operating system directly into the actual physical data address information used by the disk drive. In the conventional approach illustrated in FIG. 2, the system BIOS or translating BIOS translates the logical data address information from the operating system into CHS data address information according to the disk drive industry standards. However, since the system BIOS or translating BIOS does not include the defect information or the specific physical configuration and zone information of the disk drive, the firmware of the disk drive itself must perform another level of translation in order to determine the actual physical data storage location and then use this actual data storage location to cause the disk drive controller to read or write the requested data. By eliminating this additional translation performed by the disk drive firmware of the prior art system, the approach of the invention speeds up the overall process of handling a read/write request from the operating system and the disk drive and improves the performance of the overall system.

The loadable device driver of the present invention may take on a wide variety of specific forms and still remain within the scope of the present invention. These forms may be specific to a particular peripheral bus (such as a PCI bus), to other computer architectures (such as a certain processor), and to particular mass memory storage devices (such as a specific model of a hard disk drive). Also, since the loadable device driver of the present invention communicates directly with the mass memory storage device without requiring the use of the system BIOS, a wide variety of protocols may be used for the communication between the loadable device driver and the mass memory storage device. These protocols do not need to conform to the constraints of the system BIOS and therefore a protocol may be used which maximizes the performance of the particular mass memory storage device associated with the loadable device driver.

Referring to FIG. 5, one specific embodiment of the protocol for making the defect information sorted by the loadable device driver available to the disk drive firmware of the disk drive will now be describe. In this embodiment, loadable device driver 66 includes a pointer 80 associated with defect lists 69. As mentioned above, defect lists 69 contain a list of all of the defective memory locations for hard disk drive 56. FIG. 5 illustrates in tabular form an example of a portion of such a defect list. In this list the letters A–E in the leftmost column represent pointer addresses which identify a specific location within the defect list. The second, third, and fourth columns correspond to the specific cylinder, head, and sector of each of the defective memory locations. In this particular embodiment, when loadable device driver 66 receives a read/write request which includes the amount of data requested from operating system 64, it uses the defect list to identify the known good memory location associated with the beginning of the data being requested. Loadable device driver 66 then sorts through the defect list and identifies the first defective memory location following the known good beginning data memory location. Pointer 80 is assigned the pointer address corresponding to this first defective memory location. Loadable device driver 66 then sends the pointer address of the first defect to disk drive firmware 74 of disk drive 56 along with the data address information at which drive controller 72 is to begin reading/writing data and the amount of data disk drive controller 72 should read/write. Disk drive firmware 74 uses pointer 80 to obtain the defective memory locations which are associated with the read/write request from loadable device driver 66 without requiring disk drive firmware 74 to sort through the entire defect list.

In the specific example illustrated in FIG. 5, loadable device driver 66 receives a read request from operating system 64. Loadable device driver 66 determines that the read request corresponds to ten sectors of data stored beginning at the known good memory storage location of cylinder 23, head 1, and sector 1. Using this memory storage location address, loadable device driver 66 sorts through the defect list to identify the next successive memory location that is defective. In this case, the next successive memory location that is defective is the location which corresponds to cylinder 23, head 1, and sector 2. Since this defective memory location is assigned pointer address C as shown in FIG. 5, loadable device driver 66 provides disk drive firmware 74 with the pointer address C along with the read request for ten sectors of data beginning at the location of cylinder 23, head 1, and sector 1. As disk drive controller 72 is positioning head 1 to read the requested information, disk drive firmware 74 uses pointer 80 to obtain a predetermined number of the successive defective memory locations from defect lists 69 in host RAM beginning with the defective memory location indicated by pointer 80. In this case, only the first defective location which corresponds to pointer address C is relevant to the information being read, however, in other specific situations there may be many defective memory locations associated with the data to be read. Disk drive firmware 74 uses these defective memory locations which are specific to the data being read to cause disk drive controller 72 to skip the defective memory locations and insure that only good data sectors are utilized.

Although only one specific example of the protocol for making the defect information available to the disk drive firmware of the disk drive has been described, it should be understood that the invention is not limited to this specific embodiment. The particular protocol used to provide this function may take on a wide variety of specific forms and still remain within the scope of the present invention. This is also the case for other functions and/or data which may be moved from the disk drive firmware of the disk drive to the system RAM. As mentioned above, since the loadable device driver of the present invention communicates directly with the mass memory storage device without requiring the use of the system BIOS, a wide variety of protocols may be used for the communication between the loadable device driver and the mass memory storage device. These protocols do not need to conform to the constraints of the system BIOS and therefore a protocol may be used which maximizes the performance of the particular mass memory storage device associated with the loadable device driver.

The loadable device driver of the present invention has been described above as including a list of the defective memory locations of the mass memory storage device and information on the specific configuration of the device so that the loadable device driver is able to perform the translating function and the function of sorting through the defect list. However, this general approach of moving certain functions and/or data from the device to the host computer by using the loadable device driver to perform these functions may include a variety of other functions. By moving these other functions and/or data to the host computer using the loadable device driver, the complexity of the drive may be further reduced resulting in further cost savings.

As will be describe in more detail hereinafter, in the case of a hard disk drive, some examples of the functions which may be moved from a conventional disk drive controller to the host system using the loadable device driver of the invention are; (i) detecting new defective memory locations and adding these new defective locations to both the permanent defect lists stored on the memory storage of the mass memory storage and the defect lists within the host RAM for use during the operation of the system, (ii) determining chip settings for the disk drive controller based on the known configuration of the device and providing read channel information to the disk drive controller, and (iii) allocating host system RAM rather than RAM provided on the disk drive for use as read/write cache. Although these three specific examples of functions and/or data which may be moved from the device to the host system are given, it should be understood that the invention is not limited to these specific examples. Also, it should be understood that the present invention is not limited to a loadable device driver including these specific examples, but instead would apply to any loadable device driver for a mass memory storage device which included sufficient information to allow the device driver to translate read/write requests from the operating system without requiring the use of the system BIOS or any other translation mechanism between the operating system and the mass memory storage device.

Referring to FIG. 3, the example of moving the function of detecting and storing new defective memory locations into the defect lists will be briefly described. In this case, system 46 would include an arrangement for detecting and confirming data errors. If it is determined using these methods that these data errors are the result of newly found, additional defective memory locations or damage to the associated data sector on disk drive 56, loadable device driver 66 adds the newly found, additional defective memory location to defect lists 69 within host system RAM 50. However, in order to permanently add the newly found, additional defective memory location to the defect lists, loadable device drive 66 also adds the newly found defective memory location to the permanent defect lists stored in the mass memory storage 58 of mass memory storage device 56. If the permanent defect lists stored on mass memory storage 58 are located in a portion of the memory which is protected or that is not accessible during the normal operation of the device, loadable device driver 66 may include an arrangement, such as a utility program, which allows the loadable device drive to access the portion of the memory containing the permanent defect lists thereby allowing the loadable device driver to add the newly found defective memory location to the defect lists.

In conventional disk drives, the disk drive firmware which controls the operation of the drive controller typically includes information on various settings which are used to control the drive controller. One example of this is the various data read/write rates associated with the different zones of the disk drive. As mentioned above, the function of providing these chip settings or settings for controlling the operation of the drive controller may be included as part of the functions and/or data loaded into host system RAM. If this is the case, still referring to FIG. 3, loadable device driver 66 uses the information on the specific configuration of the disk drive included within loadable device driver 66 to determine, based on the read/write request from operating system 64, which zone of the disk drive the read/write request is associated with. Using this zone information, loadable device driver 66 determines the proper settings for drive controller 72 and includes the proper commands with the read/write request to set drive controller 72 to the proper settings. Furthermore, if the read/write request includes data which involves data sectors in more than one zone, disk drive firmware 74 determines at what point within the requested data the zone changes from one zone to another and reads from system RAM 50 the appropriate chip settings. Although the controller settings for different zones has been used as an example, it should be understood that this same approach would apply to other specific operating parameters all of which would fall within the scope of the invention.

The third example of functions which may be moved from the disk drive to the loadable device driver is the example of the read/write cache. In conventional disk drives, a fairly large RAM memory buffer is provided as part of the disk drive. In some conventional disk drives, a portion of this RAM memory buffer is used as a read ahead memory cache. However, as mentioned above, the present invention allows this function to be moved from the disk drive to the loadable device driver. By doing this, host system RAM may be used to provide the memory space for the read ahead memory cache thereby reducing the amount of memory buffer RAM necessary within the disk drive. Referring to, FIG. 3, when loadable device driver 66 receives a read request from operating system 64, it determines how much additional data will be read into a read ahead cache. Loadable device driver 66 obtains space within system RAM 50 for storing this additional data and instructs drive controller 72 to read not only the requested data but also the additional data which loadable device driver 66 stores in the memory space obtained within system RAM 50. This approach not only reduces the need for RAM memory buffer space, but also improves the performance of the system. By storing the read ahead cache in the system RAM, it may be accessed by the host system without having to access in any way the disk drive. Also, since loadable device driver 66 has information on the specific configuration of disk drive 56, it may be arranged to take advantage of this information in order to more effectively read ahead by reading data which may not necessarily be the next successive data on disk drive 56.

This general approach of moving functions and/or data, that is operating parameters, required for the operation of a particular peripheral device from the peripheral device to system RAM may also be applied to peripheral devices other than mass memory storage devices. Referring to FIG. 6 a computer system in accordance with this aspect of the invention and generally designated by reference numeral 82 will be described. System 82 includes a host computer module 84 having system RAM 86 and includes a particular peripheral computer device 88 connected to host computer module 84 and RAM 86 through a suitable and compatible bus (not shown). Peripheral computer device 88 requires certain operating parameters 90 for its operation. System 82 further includes an arrangement 92 for loading operating parameters 90 from a source 94 into system RAM 86 during the start-up of the system and for allowing the system to use operating parameters 90 during the operation of the system to control the operation of peripheral computer device 88.

Arrangement 92 may be provided as part of a loadable device driver such as the loadable device driver described in detail for the previously described embodiments. Alternatively, as described in detail in the referenced patent application, the operating parameters may be loaded as part of an expansion BIOS associated with the particular peripheral computer device. This expansion BIOS may be at least partially stored in a mass memory storage device connected to the system in the manner described in detail in the referenced patent. Source 94 may be ROM provided on board the particular peripheral, computer device 88 itself, or any other source such as mass memory storage on a mass memory storage peripheral computer device connected to the system. Some examples of mass memory storage devices which may be used as source 94 are hard disk drives, compact disk drives, tape drives, or floppy disk drives. Although these specific examples are given, it should be understood that the present invention would equally apply regardless of the specific arrangement used to load the operating parameters into system RAM and regardless of the specific source used to provide the operating parameters.

During the operation of the system, system 82 has access to operating parameters 90 stored in RAM 86 such that system 82 may use operating parameters 90 to control the operation of particular peripheral device 88. These operating parameters may be used by peripheral device 88 itself to control its own operation. For example, as describe above in detail the device may be a hard disk drive and the operating parameters may be the defect list identifying the defective memory locations on the disk drive. Alternatively, host computer 84 may use operating parameters 90 to control the operation of peripheral device 88. This approach of storing the operating parameters for peripheral devices in the system RAM reduces or eliminates the need for providing certain memory space on the peripheral device. These savings significantly reduce the cost of providing the particular peripheral computer device.

It should be understood that this general approach for operating a particular peripheral computer device may take a wide variety of forms and still remain within the scope of the invention. For instance, in the case of a mass memory storage device as described in detail above, the operating parameters may be the defect lists, chip settings for the controller of the device, or read ahead cache. In the case of other types of devices such as video cards or network cards, the operating parameters would be data and/or code specific to these other devices. As can be seen in light of the examples given, this general approach may be applied to a wide variety of peripheral computer devices as well as a wide variety of specific operating parameters for any one of these variety of peripheral computer devices. The present invention would equally apply to any combination of these, so long as operating parameters associated with a particular computer device are stored within the system RAM for use by the system.

Although the peripheral bus has been described in the earlier embodiments as being a PCI bus, this is not a requirement. As mentioned above, any peripheral bus which allows relocatable expansion BIOS location addresses are allowed would equally apply. In fact, for the general approach of moving operating parameters required for the operation of a particular peripheral device from the peripheral device to system RAM, the peripheral bus may be any bus which allows the operating parameters to be stored in system RAM during the start-up of the system. Also, although the mass memory storage device has been described throughout as a hard disk drive, the invention would equally apply to other mass memory storage devices such as compact disk drives, tape drives, or floppy disk drives. Furthermore, although the addressing scheme for addressing the mass memory storage devices has been described throughout as using a CHS or cylinder, head, sector, and zone addressing scheme, this is not a requirement. Instead, any addressing scheme including, but not limited to, linear addressing schemes (such as those used by CD players) or holographic addressing schemes using XYZ coordinates to define memory locations would also fall within the scope the invention. Therefore, the present examples are to be considered as illustrative and not restrictive, and the invention is not to be limited to the details given herein, but may be modified within the scope of the appended claims.

What is claimed is:

1. In a computer system including a host computer which is operated using a particular operating system and a system BIOS, the computer system having system RAM associated with the host computer and a mass memory storage peripheral computer device which is connected to the host computer using a peripheral bus in which relocatable expansion BIOS location addresses are allowed, an arrangement for allowing the host computer to operate the mass memory storage peripheral computer device, the arrangement comprising:

a) a loadable device driver including data address translating means for translating data address information communicated between the operating system and the mass memory storage peripheral computer device; and
   b) means for loading the loadable device driver into the system RAM during the start-up of the system for use during the operation of the system
      (i) such that the loadable device driver is in communication with the operating system in a way which does not require the system BIOS, any protocol translation, or any other type of data address translation mechanism to be provided between the loadable device driver and the operating system in order for the loadable device driver to communicate with the operating system and
      (ii) such that the loadable device driver is in communication with the mass memory storage peripheral computer device through the peripheral bus in a way which does not require the system BIOS, any protocol translation, or any other type of data address translation mechanism to be provided between the loadable device driver and the mass memory storage device in order for the loadable device driver to communicate with the mass memory storage device.

2. An arrangement according to claim 1 wherein the loadable device driver is in direct communication with the operating system and the mass memory storage peripheral computer device without any translation mechanism between the loadable device driver and the mass memory storage peripheral computer device.

3. An arrangement according to claim 1 wherein;
   a) the loadable device driver is stored within the mass memory storage of the mass memory storage peripheral computer device, and
   b) the means for loading the loadable device driver into the system RAM during the start-up of the system includes means for loading the loadable device driver from the mass memory storage peripheral computer device into the system RAM during the start-up of the system for use during the operation of the system.

4. An arrangement according to claim 1 wherein the translating means translates data address information between (i) logical address information used by the operating system which is associated with a theoretical location of the data within a theoretical mass memory storage device and (ii) physical address information used by the mass memory storage peripheral computer device, the physical address information being associated with the actual physical location at which the data is stored within the mass memory storage of the mass memory storage peripheral computer device.

5. An arrangement according to claim 1 wherein the peripheral bus is a PCI bus for connecting peripheral computer devices to the host computer and wherein the system utilizes PCI protocol for using the PCI bus.

6. An arrangement according to claim 1 wherein the peripheral bus is a serial bus for connecting peripheral computer devices to the host computer and wherein the system utilizes a particular protocol for using the serial bus.

7. An arrangement according to claim 3 wherein the mass memory storage peripheral computer device is a hard disk drive and the loadable device driver is contained within the mass memory storage of the hard disk drive.

8. An arrangement according to claim 7 wherein the loadable device driver is stored in a portion of the hard disk drive mass memory storage which is not user accessible.

9. An arrangement according to claim 7 wherein the hard disk drive includes a particular number of cylinders, heads, sectors, and zones which precisely define a particular data storage area within the mass memory storage of the hard disk drive and wherein the physical address information associated with the actual physical location at which the data is stored within the mass memory storage of the mass memory storage peripheral computer device includes information giving the correct cylinder, head, sector, and zone within which the data is stored.

10. An arrangement according to claim 7 wherein the loadable device driver includes permanently stored defect information identifying defective memory locations on the mass memory storage of the hard disk drive and wherein the loadable device driver uses the permanently stored defect information and the translating means to translate the data address information between the operating system and the mass memory storage device such that the defective memory locations on the mass memory storage of the hard disk drive are not utilized during the operation of the system.

11. An arrangement according to claim 10 wherein:
a) the system includes means for detecting additional defective memory locations on the mass memory storage of the hard disk drive during a given period of operation of the hard disk drive; and
b) the loadable device driver includes means for storing additional defect information identifying those additional defective memory locations, the additional defect information being stored during the given period of operation of the hard disk drive
   (i) within the system RAM for use by the loadable device driver and
   (ii) within the hard disk drive such that the additional defective memory locations become part of the permanently stored defect information.

12. An arrangement according to claim 10 wherein;
a) the loadable device driver uses the permanently stored defect information and the translating means to always access the mass memory storage of the hard disk drive at an initial non-defective address location forming part of the data address information being translated between the operating system and the hard disk drive, and
b) the loadable device driver includes means for using the defect information to identify at least the first successive defective memory location on the mass memory storage of the hard disk drive which is associated with the data address information being translated between the operating system and the hard disk drive.

13. An arrangement according to claim 1 further comprising means for loading additional operating parameters associated with the mass memory storage peripheral computer device from the mass memory storage peripheral device into the system RAM during the start-up of the system for use by the system to operate the mass memory storage peripheral device.

14. An arrangement according to claim 13 wherein the mass memory storage peripheral computer device includes a controller for controlling the memory storage functions of the mass memory storage device and wherein the additional operating parameters include settings for the controller.

15. An arrangement according to claim 13 wherein the means for loading additional operating parameters during the start-up of the system includes means for allocating a portion of the system RAM for use by the mass memory storage peripheral computer device during the operation of the system as a read ahead cache.

16. In a computer system including a host computer which is operated using a particular operating system and a system BIOS, the computer system having system RAM associated with the host computer and a mass memory storage peripheral computer device which is connected to the host computer using a peripheral bus in which relocatable expansion BIOS location addresses are allowed, a method for allowing the host computer to operate the mass memory storage peripheral computer device, the method comprising the steps of:
a) providing a loadable device driver including data address translating means for translating data address information communicated between the operating system and the mass memory storage peripheral computer device;
b) during the start-up of the system, loading the loadable device driver into the system RAM for use during the operation of the system
   (i) such that the loadable device driver is in communication with the operating system in a way which does not require the system BIOS, any protocol translation, or any other type of data address translation mechanism to be provided between the loadable device driver and the operating system in order for the loadable device driver to communicate with the operating system and
   (ii) such that the loadable device driver is in communication with the mass memory storage peripheral computer device through the peripheral bus in a way which does not require the system BIOS, any protocol translation, or any other type of data address translation mechanism to be provided between the loadable device driver and the mass memory storage device in order for the loadable device driver to communicate with the mass memory storage device; and
c) using the translating means of the loadable device driver, translating data address information communicated between the operating system and the mass memory storage peripheral computer device during the operation of the system.

17. A method according to claim 16 wherein the step of loading the loadable device driver includes the step of loading the loadable device driver such that the loadable device driver is in direct communication with the mass memory storage peripheral computer device without any translation mechanism between the loadable device driver and the mass memory storage peripheral computer device.

18. A method according to claim 16 wherein;
a) the step of providing the loadable device driver includes the step of providing the loadable device driver which is stored within the mass memory storage of the mass memory storage peripheral computer device, and
b) the step of loading the loadable device driver includes the step of loading the loadable device driver from the mass memory storage peripheral-computer device into the system RAM during the start-up of the system for use during the operation of the system.

19. A method according to claim 16 wherein the step of translating data address information includes the step of translating data address information between (i) logical address information used by the operating system which is associated with a theoretical location of the data within a theoretical mass memory storage device and (ii) physical address information used by the mass memory storage peripheral computer device, the physical address information being associated with the actual physical location at which the data is stored within the mass memory storage of the mass memory storage peripheral computer device.

20. A method according to claim 16 wherein the peripheral bus used to connect the mass memory storage peripheral computer device to the host computer is a PCI bus and wherein the system utilizes PCI protocol for using the PCI bus.

21. A method according to claim 16 wherein the peripheral bus used to connect the mass memory storage peripheral computer device to the host computer is a serial bus and wherein the system utilizes a particular protocol for using the serial bus.

22. A method according to claim 18 wherein the mass memory storage peripheral computer device is a hard disk drive and wherein the step of providing a loadable device driver includes the step of providing a loadable device driver stored within the mass memory storage of the hard disk drive.

23. A method according to claim 22 wherein the step of providing a loadable device driver includes the step of providing a loadable device driver stored in a portion of the hard disk drive mass memory storage which is not user accessible.

24. A method according to claim 22 wherein the hard disk drive includes a particular number of cylinders, heads, sectors, and zones which precisely define a particular data storage area within the mass memory storage of the hard disk drive and wherein the step of translating data address information between logical address information and physical address information includes the step of translating data address information between logical address information and physical address information giving the correct cylinder, head, sector, and zone within which the data is stored on the mass memory storage of the hard disk drive.

25. A method according to claim 22 wherein the step of providing a loadable device driver includes the step of providing a loadable device driver which includes permanently stored defect information identifying defective memory locations on the mass memory storage of the hard disk drive and wherein the step of translating data address information includes the step of using the permanently stored defect information to translate the data address information between the operating system and the mass memory storage device such that the defective memory locations on the mass memory storage of the hard disk drive are not utilized during the operation of the system.

26. A method according to claim 25 further including the steps of;
a) detecting additional defective memory locations on the mass memory storage of the hard disk drive during a given period of operation of the hard disk drive, and
b) storing additional defect information identifying those additional defective memory locations during the given period of operation of the hard disc drive
  (i) within the system RAM for use by the loadable device driver and
  (ii) within the hard disk drive such that the additional defective memory locations become part of the permanently stored defect information.

27. A method according to claim 25 further including the steps of:
a) using the permanently stored defect information and the translating means, accessing the mass memory storage of the hard disk drive at an initial non-defective address location forming part of the data address information being translated between the operating system and the hard disk drive;
b) providing means for identifying at least the first successive defective memory location on the mass memory storage of the hard disk drive which is associated with the data address information being translated between the operating system and the hard disk drive; and
c) using the means to indicate the locations of defective memory locations, translating data address information communicated between the operating system and the mass memory storage peripheral computer device during the operation of the system such that the defective memory locations on the mass memory storage of the hard disk drive are not utilized during the operation of the system.

28. A method according to claim 16 further comprising the step of loading additional operating parameters associated with the mass memory storage peripheral computer device from the mass memory storage peripheral device into the system RAM during the start-up of the system for use by the system to operate the mass memory storage peripheral device.

29. A method according to claim 28 wherein the mass memory storage peripheral computer device includes a controller for controlling the memory storage functions of the mass memory storage device and wherein the step of loading the additional operating parameters into the system RAM includes the step of loading settings for the controller into system RAM.

30. A method according to claim 28 wherein step of loading additional operating parameters during the start-up of the system includes the step of allocating a portion of the system RAM for use by the mass memory storage peripheral computer device during the operation of the system as a read ahead cache.

31. A loadable device driver for use in a computer system including a host computer which is operated using a particular operating system and a system BIOS, the computer system having system RAM associated with the host computer and a mass memory storage peripheral computer device which is connected to the host computer using a peripheral bus in which relocatable expansion BIOS location addresses are allowed, the loadable device driver comprising:

data address translating means which may be loaded into the system RAM for translating data address information communicated between the operating system and the mass memory storage peripheral computer device in a way which does not require the system BIOS, any protocol translation, or any other type of data address translation mechanism to be provided between the loadable device driver and the operating system in order for the loadable device driver to communicate with the operating system and the mass memory storage peripheral computer device.

32. A loadable device driver according to claim 31 wherein the loadable device driver is in direct communication with the mass memory storage peripheral computer device without any translation mechanism between the loadable device driver and the mass memory storage peripheral computer device.

33. A loadable device driver according to claim 31 wherein the loadable device driver is stored within the mass memory storage of the mass memory storage peripheral computer device.

34. In a mass memory storage peripheral computer device for use in a computer system including a host computer which is operated using a particular operating system and a system BIOS, the computer system having system RAM associated with the host computer and having the mass memory storage peripheral computer device connected to the host computer using a peripheral bus in which relocatable expansion BIOS location addresses are allowed, an arrangement for allowing the host computer to operate the mass memory storage peripheral computer device, the arrangement comprising:
  a) a loadable device driver including data address translating means for translating data address information communicated between the operating system and the mass memory storage peripheral computer device; and
  b) means for loading the loadable device driver into the system RAM during the start-up of the system for use during the operation of the system
    (i) such that the loadable device driver is in communication with the operating system in a way which does not require the system BIOS, any protocol translation, or any other type of data address translation mechanism to be provided between the loadable device driver and the operating system in order for the loadable device driver to communicate with the operating system and
    (ii) such that the loadable device driver is in communication with the mass memory storage peripheral computer device through the peripheral bus in a way which does not require the system BIOS, any protocol translation, or any other type of data address translation mechanism to be provided between the loadable device driver and the mass memory storage device in order for the loadable device driver to communicate with the mass memory storage device.

35. A computer memory storage medium for use in a computer system including a host computer which is operated using a particular operating system and a system BIOS, the computer system having system RAM associated with the host computer and a mass memory storage peripheral computer device which is connected to the host computer using a peripheral bus in which relocatable expansion BIOS location addresses are allowed, the computer memory storage medium comprising
  a portion thereof containing a loadable device driver which may be loaded into the system RAM, the loadable device driver including data address translating means for translating data address information communicated between the operating system and the mass memory storage peripheral computer device in a way which does not require the system BIOS, any protocol translation, or any other type of data address translation mechanism to be provided between the loadable device driver and the operating system in order for the loadable device driver to communicate with the operating system and,the mass memory storage peripheral computer device.

36. A computer memory storage medium according to claim 35 wherein the computer memory storage medium is a floppy disk.

37. A computer memory storage medium according to claim 36 wherein the loadable device driver contained on the computer memory storage medium is an updated and revised loadable device driver which may be transferred from the floppy to the mass memory storage peripheral computer device thereby updating an original loadable device driver already existing within the mass memory storage of the mass memory storage peripheral computer device.

38. A computer memory storage medium according to claim 35 wherein the memory storage medium further includes means for loading the loadable device driver into the system RAM during the start-up of the system for use during the operation of the system
  a) such that the loadable device driver is in communication with the operating system in a way which does not require the system BIOS, any protocol translation, or any other type of data address translation mechanism to be provided between the loadable device driver and the operating system in order for the loadable device driver to communicate with the operating system and
  b) such that the loadable device driver is in communication with the mass memory storage peripheral computer device through the peripheral bus in a way which does not require the system BIOS, any protocol translation, or any other type of data address translation mechanism to be provided between the loadable device driver and the mass memory storage device in order for the loadable device driver to communicate with the mass memory storage device.

39. A computer memory storage medium according to claim 38 wherein the computer memory storage medium is a floppy disk.

40. In a computer system including a host computer having system RAM and a particular peripheral computer device connected to the host computer, an arrangement for operating the particular peripheral computer device, the arrangement comprising;
  a) means for loading and storing operating parameters associated with the particular peripheral computer device into the system RAM during the start-up of the system for use during the operation of the system,
  b) means for allowing at least the particular peripheral computer device access to the operating parameters stored in system RAM during the operation of the system such that the particular peripheral computer device may use the operating parameters stored in system RAM to control its operation during the operation of the system.

41. An arrangement according to claim 40 wherein the host computer uses the operating parameters stored in system RAM to control the operation of the particular peripheral computer device.

42. An arrangement according to claim 40 wherein the system includes a mass memory storage peripheral computer device and wherein the operating parameters associated with the particular peripheral computer device are stored within the mass memory storage of the mass memory storage peripheral computer device and loaded from the mass memory storage peripheral computer device into the system RAM during the start-up of the system.

43. An arrangement according to claim 42 wherein the particular peripheral computer device is the mass memory storage device.

44. An arrangement according to claim 43 wherein the operating parameters include defect lists containing information on the defective memory locations of the mass memory storage peripheral computer device.

45. An arrangement according to claim 43 wherein the mass memory storage peripheral computer device includes a controller for controlling the memory storage functions of the mass memory storage device and wherein the parameters include settings for the controller.

46. An arrangement according to claim 43 wherein the means for loading the operating parameters during the start-up of the system includes means for allocating a portion of the system RAM for use by the mass memory storage peripheral computer device during the operation of the system as a read ahead cache.

47. In a computer system including a host computer having system RAM and a particular peripheral computer device connected to the host computer, a method for operating the particular peripheral computer device, the method comprising the steps of:
   a) providing operating parameters used for the operation of the particular peripheral computer device stored within memory associated with the system,
   b) loading and storing the operating parameters associated with the particular peripheral computer device into the system RAM during the start-up of the system for use during the operation of the system,
   c) during the operation of the system, allowing at least the particular peripheral computer device access to the operating parameters stored in system RAM such that the particular peripheral computer device may use the operating parameters stored in system RAM to control its operation.

48. A method according to claim 47 wherein the step of allowing at least the particular peripheral computer device access to the operating parameters stored in the system RAM includes the step of allowing the host computer to use the operating parameters stored in system RAM to control the operation of the particular peripheral computer device.

49. A method according to claim 47 wherein;
   a) the step of providing operating parameters used for the operation of the particular peripheral computer device stored within memory associated with the system includes the step of providing a mass memory storage peripheral computer device having operating parameters associated with the particular peripheral computer device stored within the mass memory storage of the mass memory storage peripheral computer device, and
   b) the step of loading the operating parameters associated with the particular peripheral computer device into the system RAM during the start-up of the system includes the step of loading the operating parameters from the mass memory storage peripheral computer device into the system RAM during the start-up of the system.

50. A method according to claim 49 wherein the particular peripheral computer device is the mass memory storage device.

51. A method according to claim 50 wherein the operating parameters include defect lists containing information on the defective memory locations of the mass memory storage peripheral computer device.

52. A method according to claim 50 wherein the mass memory storage peripheral computer device includes a controller for controlling the memory storage functions of the mass memory storage device and wherein the operating parameters include settings for the controller.

53. A method according to claim 50 wherein the step of loading the operating parameters during the start-up of the system includes the step of allocating a portion of the system RAM for use by the mass memory storage peripheral computer device during the operation of the system as a read ahead cache.

54. In a computer system including computer means for controlling a particular peripheral computer device connected to the computer system and including system RAM somewhere in the computer system other than on the particular peripheral device, an arrangement for operating the particular peripheral computer device, the arrangement comprising:
   a) means for loading and storing operating parameters associated with the particular peripheral computer device into the system RAM during the start-up of the system for use during the operation of the system; and
   b) means for allowing at least the particular peripheral computer device access to the operating parameters stored in system RAM during the operation of the system such that the particular peripheral computer device may use the operating parameters stored in system RAM to control its operation during the operation of the system.

55. An arrangement according to claim 54 wherein the computer means uses the operating parameters stored in system RAM to control the operation of the particular peripheral computer device.

56. An arrangement according to claim 54 wherein the system includes a mass memory storage peripheral computer device and wherein the operating parameters associated with the particular peripheral computer device are stored within the mass memory storage of the mass memory storage peripheral computer device and loaded from the mass memory storage peripheral computer device into the system RAM during the start-up of the system.

57. An arrangement according to claim 56 wherein the particular peripheral computer device is the mass memory storage device.

* * * * *